US011017260B2

(12) United States Patent
Wang et al.

(10) Patent No.: US 11,017,260 B2
(45) Date of Patent: May 25, 2021

(54) TEXT REGION POSITIONING METHOD AND DEVICE, AND COMPUTER READABLE STORAGE MEDIUM

(71) Applicants: BEIJING JINGDONG SHANGKE INFORMATION TECHNOLOGY CO., LTD., Beijing (CN); BEIJING JINGDONG CENTURY TRADING CO., LTD., Beijing (CN)

(72) Inventors: Yongliang Wang, Beijing (CN); Qingze Wang, Beijing (CN); Biaolong Chen, Beijing (CN)

(73) Assignees: BEIJING JINGDONG SHANGKE INFORMATION TECHNOLOGY CO., LTD., Beijing (CN); BEIJING JINGDONG CENTURY TRADING CO., LTD., Beijing (CN)

( * ) Notice: Subject to any disclaimer, the term of this patent is extended or adjusted under 35 U.S.C. 154(b) by 82 days.

(21) Appl. No.: 16/491,020

(22) PCT Filed: Dec. 29, 2017

(86) PCT No.: PCT/CN2017/119692
§ 371 (c)(1),
(2) Date: Sep. 4, 2019

(87) PCT Pub. No.: WO2018/166276
PCT Pub. Date: Sep. 20, 2018

(65) Prior Publication Data

US 2020/0012879 A1 Jan. 9, 2020

(30) Foreign Application Priority Data

Mar. 15, 2017 (CN) ........................ 201710152728.X

(51) Int. Cl.
*G06K 9/46* (2006.01)

(52) U.S. Cl.
CPC ....... *G06K 9/4604* (2013.01); *G06K 2209/01* (2013.01)

(58) Field of Classification Search
CPC ............. G06K 9/4604; G06K 2209/01; G06K 9/00456; G06K 2209/011; G06K 9/325; G06K 9/2054
See application file for complete search history.

(56) References Cited

U.S. PATENT DOCUMENTS

2013/0243321 A1* 9/2013 Shimazaki ............... G06K 9/38 382/170
2016/0283818 A1* 9/2016 Liu ...................... G06K 9/4604

FOREIGN PATENT DOCUMENTS

CN 1542697 A 11/2004
CN 102332096 A 1/2012
(Continued)

OTHER PUBLICATIONS

Combined Chinese Office Action and Search Report dated Dec. 17, 2019, in Patent Application No. 201710152728.X, 24 pages (with unedited computer generated English translation and English Translation of Category of Cited Documents).
(Continued)

*Primary Examiner* — Christopher Wait
(74) *Attorney, Agent, or Firm* — Oblon, McClelland, Maier & Neustadt, L.L.P.

(57) ABSTRACT

A text region positioning method and device, and a computer readable storage medium, which relate to the field of image processing. The text region positioning method includes acquiring a variance graph on the basis of an original image; acquiring an edge image of the variance graph; if a difference value among distances between edge points of opposing positions in two adjacent edge lines in the edge image is within a preset distance difference range, then the region
(Continued)

between the two adjacent edge lines is determined as a text region.

18 Claims, 13 Drawing Sheets

(56) References Cited

FOREIGN PATENT DOCUMENTS

| | | | |
|---|---|---|---|
| CN | 103034856 | A | 4/2013 |
| CN | 103324927 | A | 9/2013 |
| CN | 103593653 | A | 2/2014 |
| CN | 104112135 | A | 10/2014 |
| CN | 104751142 | A | 7/2015 |
| CN | 104794479 | A | 7/2015 |
| CN | 105224941 | A | 1/2016 |
| CN | 105718926 | A | 6/2016 |
| CN | 106295648 | A | 1/2017 |
| CN | 106485710 | A | 3/2017 |
| ES | 2 432 479 | B2 | 10/2014 |

OTHER PUBLICATIONS

Matlab, Technology Application, May 31, 2011, 3 pages (with English abstract).
Xiang., "An Image Edge Detection Algorithm Based on the Variance", Computer Knowledge and Technology, vol. 5, No. 31, Nov. 2009, pp. 8790-8791 (with English abstract).
Mosleh, A. et al., "Image Text Detection Using a Bandlet-Based Edge Detector and Stroke Width Transform", Department of Electrical and Computer Engineering, Dec. 31, 2012, 1 page.
Wang, W. et al., "Application of the Histograms of Stroke Width Transform in the License Plate Recognition", Science Technology and Engineering, vol. 15, No. 29, Oct. 2015, 6 pages (with English abstract).
International Search Report dated Apr. 4, 2018 in PCT/CN2017/119692 filed on Dec. 29, 2017.
Liang, T-C. et al., "Wordart Detection in Natural Scene Based on Stroke Growing", 2015, 7 pages (with English Abstract).

* cited by examiner

TEXT REGION POSITIONING METHOD AND DEVICE, AND COMPUTER READABLE STORAGE MEDIUM

CROSS-REFERENCE TO RELATED APPLICATION

This application is based on and claims the benefit of priority to the Chinese patent application No. 201710152728.X filed on Mar. 15, 2017, which is hereby incorporated by reference in its entirety into the present application.

TECHNICAL FIELD

The present disclosure relates to the field of image processing, and in particular to a character area positioning method and device, as well as a computer readable storage medium.

BACKGROUND

In the process of character recognition, since it is necessary to first position a character area in a picture using certain algorithms, and then extract the character content in the character area using a relevant image algorithm, character positioning is an important module of a character recognition engine. Currently, the common methods include Stroke Width Transform and Maximally Stable Extremal Regions.

Stroke Width Transform, which uses such a property that the printed font character has a constant stroke width, searches for a pair of parallel lines in one picture, and determines the parallel lines as strokes, and then gathers the strokes close to each other into the character area.

Maximally Stable Extremal Regions positions a character area using such a characteristic that the character area in the image may form a sharp contrast with the background image.

SUMMARY

The present disclosure proposes a character area positioning solution, which can improve the adaptability to different fonts and improve the accuracy of positioning a character area.

According to some embodiments of the present disclosure, a character area positioning method is proposed. The character area positioning method includes: obtaining a variogram according to an original image; obtaining an edge image of the variogram; determining an area between the two adjacent edge lines to be a character area according to a difference in distances between the two adjacent edge lines at different positions.

Alternatively, determining the area between the two adjacent edge lines to be the character area includes: determining first edge points in different positions of one of the two adjacent edge lines, and respectively determining a second edge point corresponding to each of the first edge points in the other one of the two adjacent edge lines; determining distances between the first edge points and the corresponding second edge points; selecting first edge points and second edge points when the difference in the determined distance is within a predetermined distance difference range; connecting the selected first edge points to determine a first edge line, and connecting the selected second edge points to determine a second edge line, and determining the area between the first edge line and the second edge line to be the character area.

Alternatively, determining the second edge point corresponding to each of the first edge points in the other one of the two adjacent edge lines comprises: emitting a half-line from the first edge point along a direction of a pixel gradient until another edge line, and determining the intersection point of the half-line and the another edge line to be a next edge point; determining that the next edge point is the second edge point when an included angle between normal vectors of the first edge point and the next edge point is less than a predetermined angle threshold.

Alternatively, obtaining the variogram according to the original image includes: obtaining a pixel value of a target pixel position in the original image, and pixel values of adjacent pixel points of the target pixel position, wherein the adjacent pixel points comprise a predetermined number of consecutive pixel points adjacent the target pixel position in different directions; determining a pixel value of the target pixel position in the variogram by taking a variance value of the pixel values of the target pixel position and the adjacent pixel points in the original image.

Alternatively, obtaining the edge image of the variogram includes: obtaining the edge image by calculating an image edge using a Canny operator based on the variogram.

Alternatively, the character area includes at least one of a transverse character area, a longitudinal character area, an italic character area, or a sector character area.

According to other embodiments of the present disclosure, a character area positioning device is provided. The character area positioning device includes: a variogram determining module, configured to obtain a variogram according to an original image; an edge image obtaining module, configured to obtain an edge image of the variogram; and a character area positioning module, configured to determine an area between the two adjacent edge lines to be a character area according to a difference in distances between the two adjacent edge lines at different positions Alternatively, the character area positioning module includes: an edge point determining unit, configured to determine first edge points in different positions of one of the two adjacent edge lines, and respectively determining a second edge point corresponding to each of the first edge points in the other one of the two adjacent edge lines; a distance determining unit, configured to determine distances between the first edge points and the corresponding second edge points; an edge line connecting unit, configured to select first edge points and second edge points when the difference in the determined distance is within a predetermined distance difference range, then connect the selected first edge points to determine a first edge line, and connect the selected second edge points to determine a second edge line, and determine the area between the first edge line and the second edge line to be the character area.

Alternatively, the edge point determining unit includes: a first edge point designating subunit, configure to take a point in the edge image as the first edge point; a next edge point obtaining subunit, configured to emit a half-line from the first edge point along a direction of a pixel gradient until another edge line, and determine the intersection point of the half-line and the another edge line to be a next edge point; a second edge point determining subunit, configure to determine that the next edge point is the second edge point when an included angle between normal vectors of the first edge point and the next edge point is less than a predetermined angle threshold.

Alternatively, the variogram determining module is configured to: obtain a pixel value of a target pixel position in the original image, and pixel values of adjacent pixel points of the target pixel position, wherein the adjacent pixel points comprise a predetermined number of consecutive pixel points adjacent the target pixel position in different directions; determine a pixel value of the target pixel position in the variogram by taking a variance value of the pixel values of the target pixel position and the adjacent pixel points in the original image.

Alternatively, the edge image obtaining module is configured to: obtain the edge image by calculating an image edge using a Canny operator based on the variogram.

Alternatively, the character area includes at least one of a transverse character area, a longitudinal character area, an italic character area, or a sector character area.

According to further embodiments of the present disclosure, a character area positioning device is proposed. The device comprises: a memory; and a processor coupled to the memory, wherein the processor is configured to perform any character area positioning method mentioned hereinbefore based on the instructions stored in the memory.

According to still further embodiments of the present disclosure, a non-transitory computer readable storage medium is proposed. The computer readable storage medium has stored thereon computer program instructions which, when executed by a processor, implement the steps of any character area positioning method mentioned hereinbefore.

BRIEF DESCRIPTION OF THE DRAWINGS

The drawings described herein are used to provide a further understanding of the present disclosure and constitute a part of the present application. The illustrative embodiments of the present disclosure as well as the descriptions thereof, which are used for explaining the present disclosure, do not constitute improper definitions on the present disclosure.

FIGS. 1A-1C are schematic views of a stroke width positioning method in the related art, wherein FIG. 1A is a stroke enlargement effect diagram, FIG. 1B is a schematic view of a contour, and FIG. 1C is a schematic view for calculating a stroke width.

DETAILED DESCRIPTION OF THE EMBODIMENTS

Figure 1A:
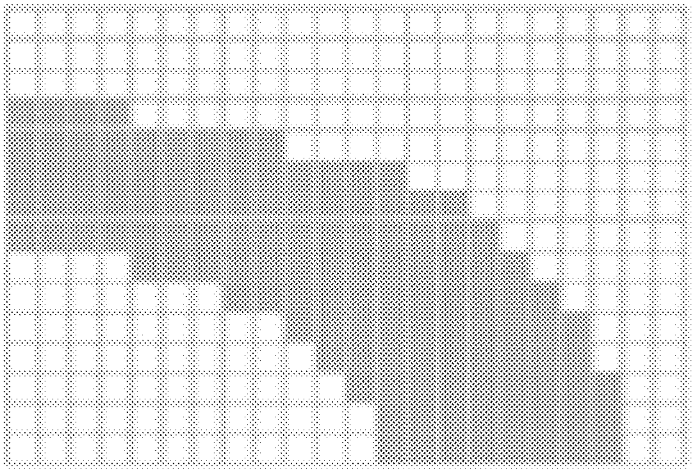

Various exemplary embodiments of the present disclosure will now be described in detail with reference to the accompanying drawings. It should be noted that: unless additionally specified, the relative arrangements, numerical expressions and numerical values of the components and steps expounded in these examples do not limit the scope of the present disclosure.

At the same time, it should be understood that, in order to facilitate the description, the dimensions of various parts shown in the drawings are not delineated according to actual proportional relations.

The following descriptions of at least one exemplary embodiment which are in fact merely descriptive, by no means serve as any delimitation on the present disclosure as well as its application or use.

The techniques, methods, and apparatuses known to a common technical person in the relevant art may not be discussed in detail, but where appropriate, techniques, methods, and apparatuses should be considered as part of the granted description.

Among all the examples shown and discussed here, any specific value should be construed as being merely illustrative, rather than as a delimitation. Thus, other examples of exemplary embodiments may have different values.

It should be noted that similar reference signs and letters present similar items in the following drawings, and therefore, once an item is defined in a drawing, there is no need for further discussion in the subsequent drawings.

Figure 1B:
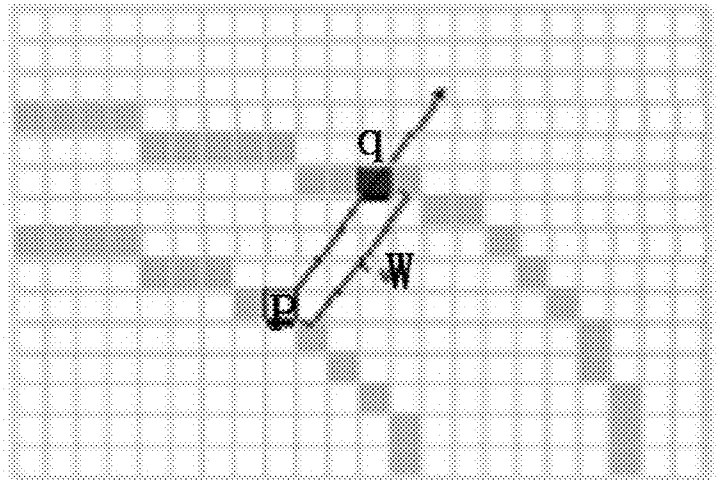
Figure 1C:
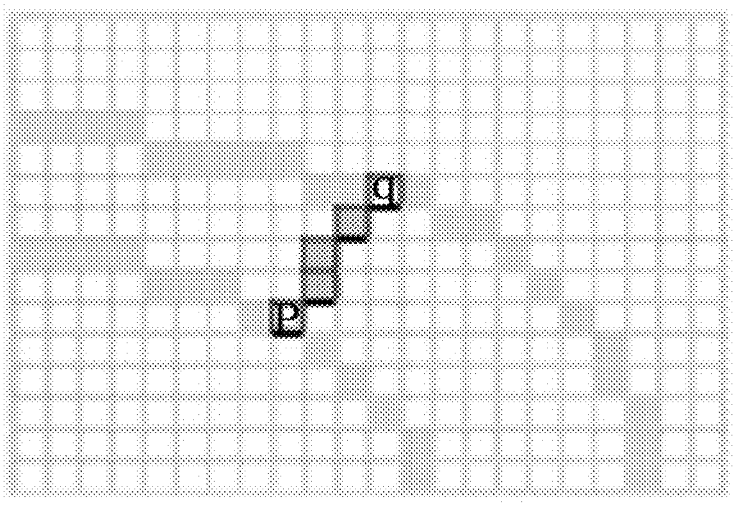

FIGS. 1A to 1C are schematic views of performing character positioning using Stroke Width Transform.

The gray area of FIG. 1A is an effect after a stroke of a character is enlarged several times, wherein the small gray grids are pixels on the stroke, and the small white grids are the image background. In FIG. 1B, two contours of the stroke are outlined using the Canny operator. It may be generally seen that the two contours are parallel to each other, wherein, p and q are opposite points on both sides of the contour, and the straight line distance between the two points is W. FIG. 1C shows a minimum distance calculated from the pixel on the contour to the pixel point on the contour parallel thereto on the basis of FIG. 1B, where this distance is a stroke width.

Figure 2:
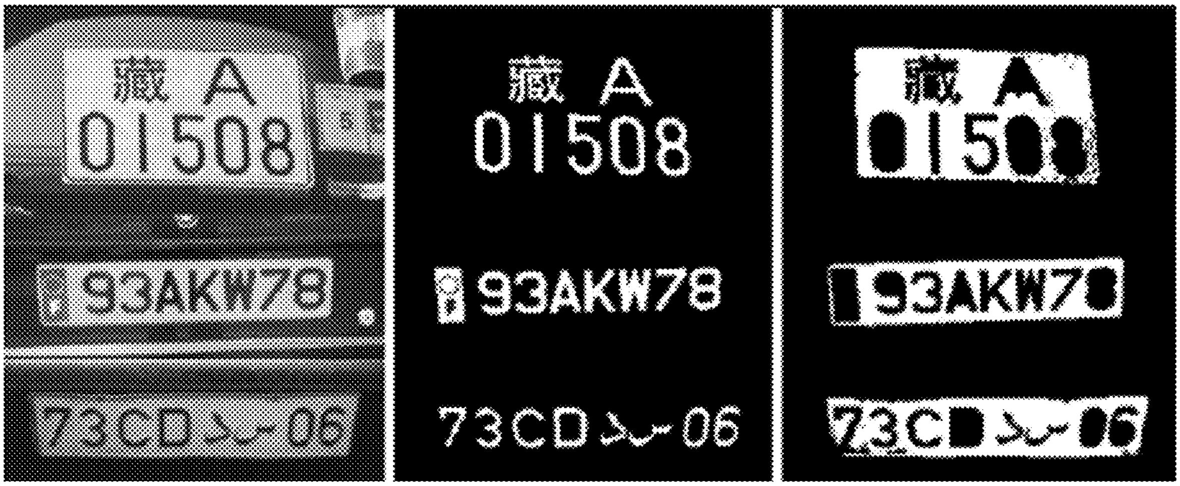
FIG. 2 is a schematic view of Maximally Stable Extremal Regions in the related art.

FIG. 2 is a schematic view of Maximally Stable Extremal Regions in the related art.

As shown in FIG. 2, the fonts in the image are in apparent color contrast with the background. By continuously increasing a binarization threshold, two images on the right may be obtained, and the character information may be clearly seen in the image on the right.

However, the above-described related art has respective different defects.

Figure 3A:
FIG. 3A is a schematic view of fonts with a consistent stroke width.
Figure 3B:
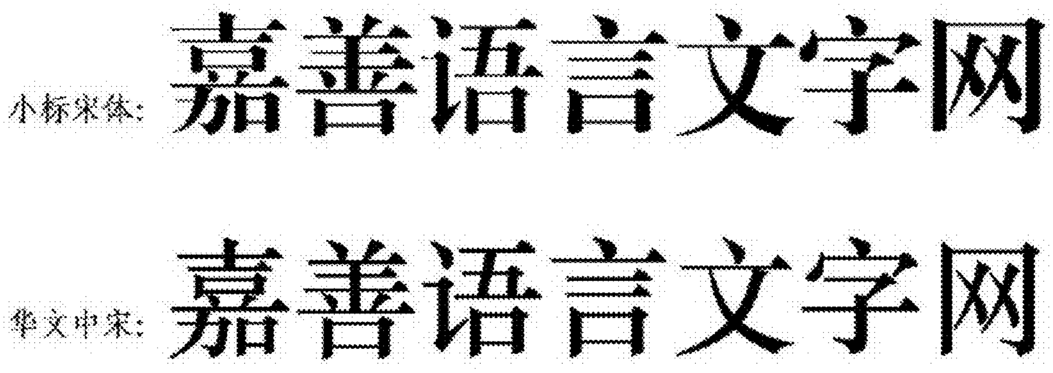
FIG. 3B is a schematic view of fonts with inconsistent stroke widths.

FIG. 3A is a schematic view of fonts with a consistent stroke width. FIG. 3B is a schematic view of fonts with inconsistent stroke widths. As shown in FIG. 3A, Microsoft JhengHei character which has a consistent stroke width, can be positioned using Stroke Width Transform. However, as shown in FIG. 3B, Song character has different stroke widths, for example the stroke '丿' has a relatively thicker width in the upper half portion and a relatively thinner thickness in the lower portion), and thus is not suitable for positioning character areas using Stroke Width Transform. Moreover, Maximally Stable Extremal Regions requires high pixel contrast in the character area, but in the application process, characters are not necessarily in the area with a high contrast, so that this algorithm is likely to introduce additional noise.

Figure 4:
FIG. 4 is a schematic view of a picture not applicable to Maximally Stable Extremal Regions.

FIG. 4 is a schematic view of a picture not applicable to Maximally Stable Extremal Regions.

As shown in FIG. 4, the Maximally Stable Extremal Regions are all at the positions selected by the rectangular frames, but only less than half of the areas are character areas. In addition, both methods used above can only position a character area first, and also require an additional algorithm to string single characters into a line, so that it is cumbersome and reduces the calculation efficiency.

The inventors have found that the above-described related art has respective different defects. Microsoft JhengHei character which has a consistent stroke width, can be positioned using Stroke Width Transform. However, Song character has different stroke widths, and thus is not suitable for being positioned using Stroke Width Transform. Moreover, Maximally Stable Extremal Regions requires high pixel contrast in the character area, but in the application process, characters are not necessarily in the area with a high contrast, so that this algorithm is likely to introduce additional noise. In addition, both methods above can only position a character area first, and also require an additional algorithm to string single characters into a line, so that it is cumbersome and reduces the calculation efficiency.

Because of such situations, the present disclosure proposes a character area positioning solution, which can improve the adaptability to different fonts and improve the accuracy of positioning a character area.

Figure 5:
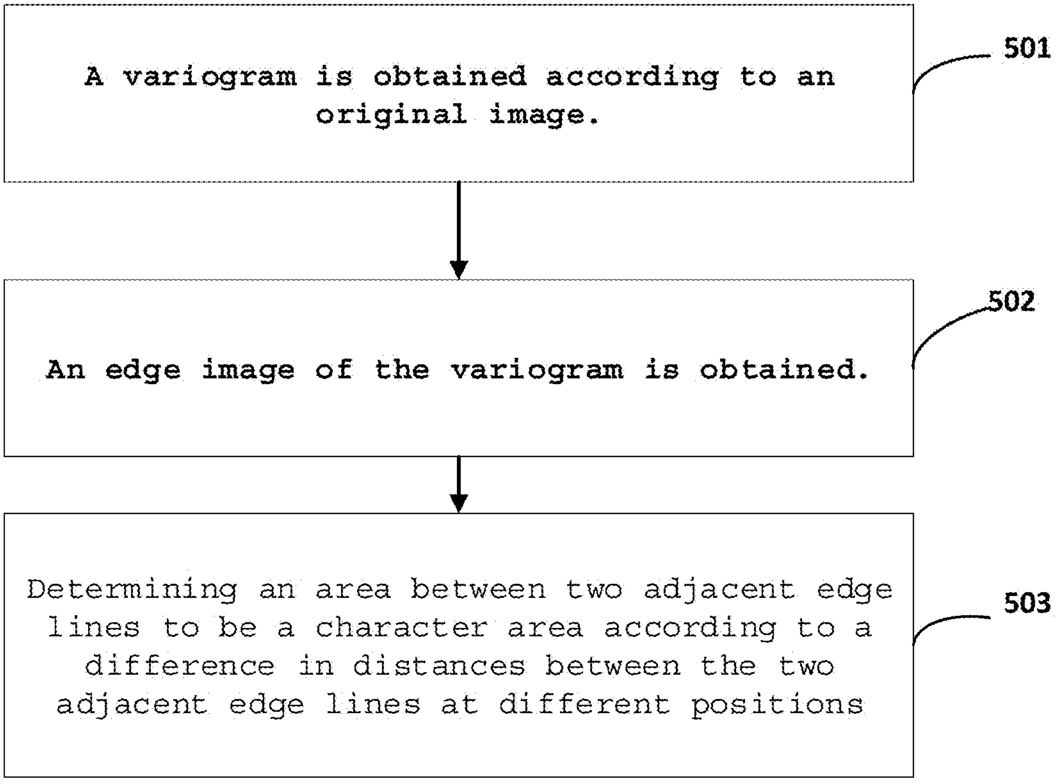
FIG. 5 is a flow chart of some embodiments of the character area positioning method of the present disclosure.

FIG. 5 shows a flowchart of some embodiments of the character area positioning method of the present disclosure. As shown in FIG. 5, the character area positioning method includes steps S501 to S503.

In step 501, a variogram is obtained according to an original image. In some embodiments, the pixel value variance of each pixel point with its several surrounding pixel points in the image may be obtained according to the pixel value of each point in the original image. For example, the variogram pixel of one point of several consecutive horizontal points is determined by taking a variance of them. The variogram may be determined by calculating a variance of the pixel values of each point with its several surrounding points.

In step 502, an edge image of the variogram is obtained. In some embodiments, the edge image may be obtained by using any edge detection algorithm in the related art.

In step 503, the area between the two adjacent edge lines is determined to be the character area according to a difference in distances between the two adjacent edge lines at different positions, for example, when the distance difference between opposite edge points in two adjacent edge lines in the edge image is within a predetermined distance range. In some embodiments, two approximately parallel edge lines may be obtained in the edge image, and the edge lines may be straight lines, curves, and may have breakpoints in the middle, and the like. If the distance between two edge lines is relatively stable and the distance variation range is within a predetermined distance difference, the area between the two edge lines may also be considered as a character area.

By such method, it is possible to determine a character area according to the distance between the edge lines in the edge image by using the characteristic of similar character heights in the character area. In this way, it is possible to adapt to various different fonts without the influence caused by variation in boldness of a character stroke, and it is possible to avoid the influence caused over positioning by the complicated pixel variation condition of the image, and improve the accuracy of positioning the character area. In addition, since it is not necessary to determine the character area word by word and then perform splicing, but to directly and rapidly position a character line in a printed font picture of a complex typeface, the efficiency of determining the character area is improved.

In some embodiments, it is possible to obtain the pixel value of the target pixel position in the original image, and pixel values of adjacent pixel points of the target pixel position, and then determine the pixel value of the target pixel position in the variogram by taking the variance value of the pixel values of the target pixel position and the adjacent pixel points in the original image. The adjacent pixel points may be a predetermined number of consecutive pixel points from the target pixel position in different directions (e.g., horizontal and vertical directions). The predetermined number may be set according to experience or actual needs. For example, assuming that the original image is G, the pixel value of the pixel point having a coordinate position of (x, y) in the original image is G(x, y), for example G(0, 0) represents the pixel value of the upper left corner of the image. Assuming that the variogram is I, the pixel value of the pixel point having a coordinate position of (x, y) in the variogram is I(x, y). Taking the horizontal variogram as an example, the adjacent pixel points of G(x, y) include G(x−t, y), G(x−t+1, y), . . . G(x−1, y), G(x+1, y), . . . G(x+t, y), according to the formula:

$$I(x,y)=\mathrm{Var}(G(x-t,y),G(x-t+1,y),\ \ldots\ G(x,y),\ G(x+1,y),\ \ldots\ G(x+t,y))$$

the pixel value I(x, y) of the point (x, y) in the variogram is calculated. In the formula, the value of t may be set according to need or effect, for example set to be 5.

For pixel points located at both ends, for example G(0,0), I(0,0) may be determined only according to G(0,0), G(1,0) . . . G(t,0).

For special applicable occasions, it is also possible to determine a vertical variogram, i.e. determining a variance value according to the pixel values of a predetermined number of consecutive pixel points in a vertical direction. It is also possible to set the pixel points within a predetermined range in the directions of up, down, left, and right to be adjacent pixel points.

Figure 6A:
FIG. 6A is an original image of some embodiments using the character area positioning method of the present disclosure.
Figure 6B:
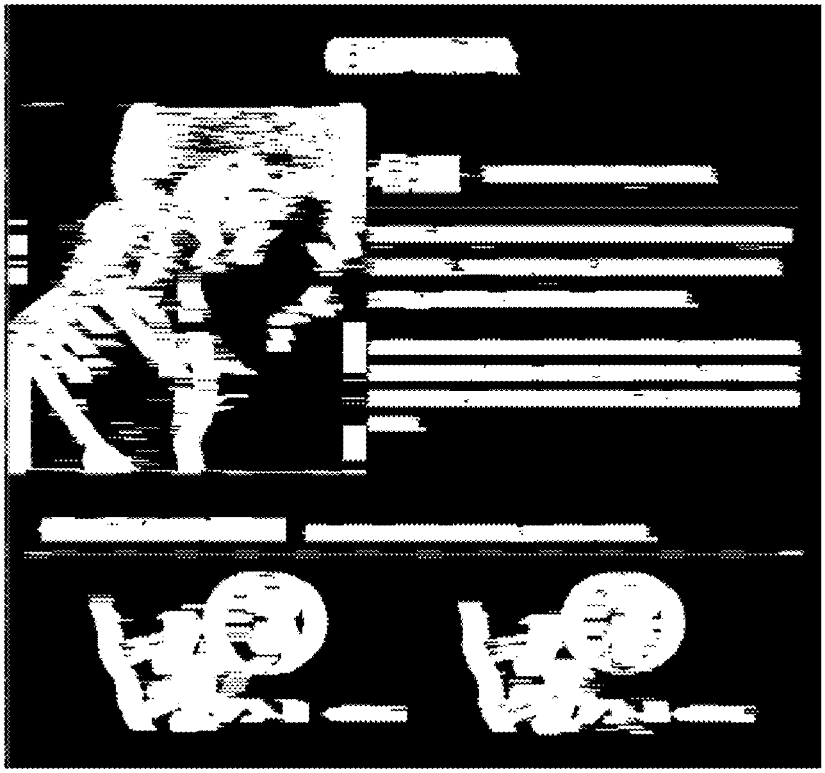
FIG. 6B is a variogram determined when the character area positioning method of the present disclosure is applied to FIG. 6A.

By such method, the variogram thereof can be calculated on the basis of the original image. The variogram can reflect a variation condition of the image, thereby obtaining a position where the image varies intensely, and facilitating distinguishing a character area from other image areas. As the original image shown in FIG. 6A, its variogram is shown in FIG. 6B. It can be seen from the variogram that, the character area which exhibits an apparently elongated shape, has prominent characteristics.

In some embodiments, on the basis of the variogram, an edge contour of the variogram may be further extracted to obtain an edge image. It may be implemented by using any edge image extraction algorithm in the related art, for example calculating an image edge by using a Canny operator to obtain an edge image.

Figure 6C:
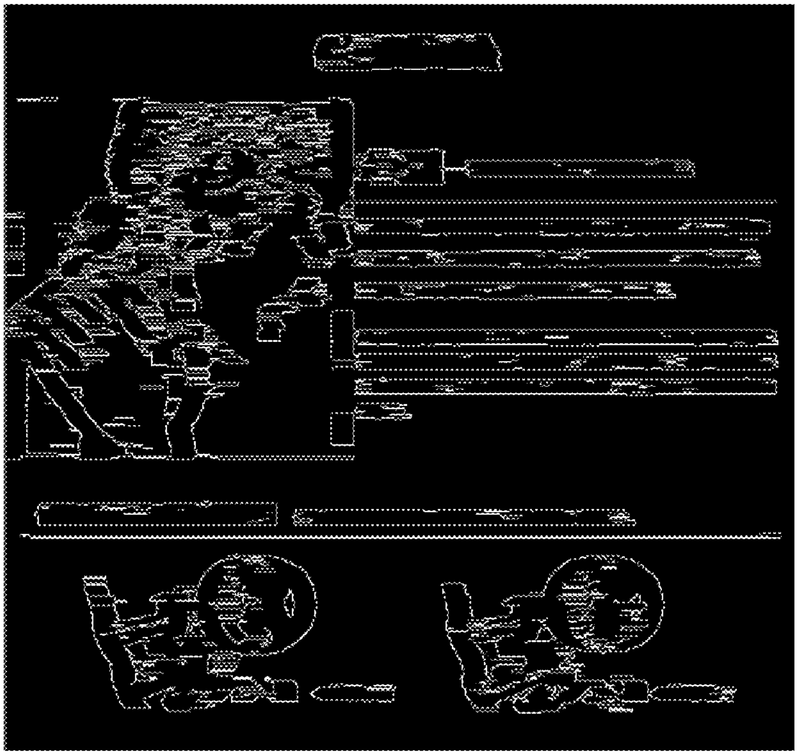
FIG. 6C is an edge image determined when the character area positioning method of the present disclosure is applied to FIG. 6B.
Figure 6D:
FIG. 6D is a schematic view of a character area determined when the character area positioning method of the present disclosure is applied to FIG. 6C.

By such method, an edge contour of the variogram can be further obtained based on variogram, thereby facilitating the calculation based on the edge image and obtaining a character area located between the edge points. As shown in FIG. 6C, an edge image in 6C can be obtained by extracting an edge contour based on the image 6B. The edge image in FIG. 6C which has clear lines, can facilitate extracting the edge point and performing distance calculation, and thus the schematic view of the character area shown in FIG. 6D is obtained.

Figure 7:
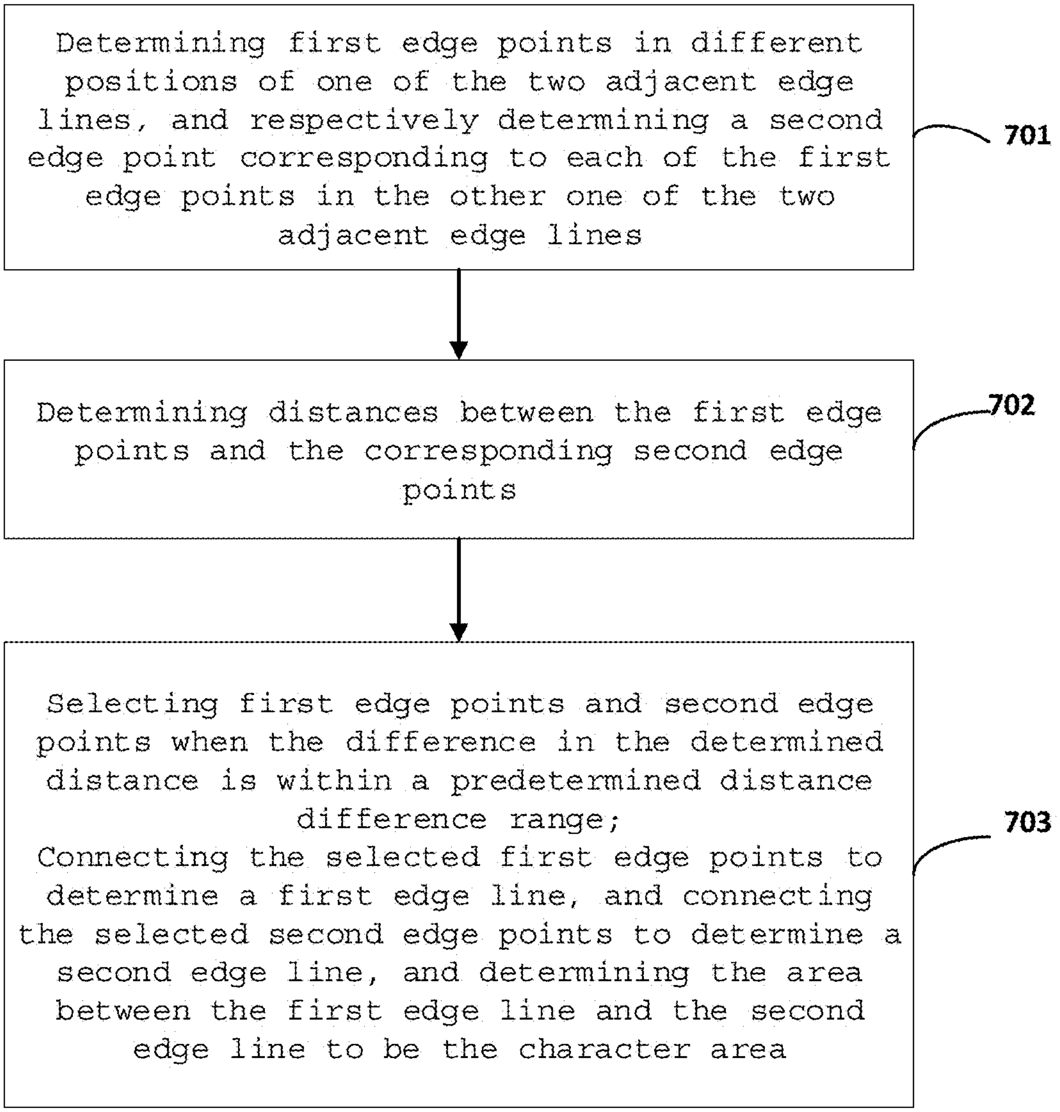
FIG. 7 is a flow chart of some embodiments of positioning a character area in an edge image in the character area positioning method of the present disclosure.

FIG. 7 shows a flow chart of some embodiments of positioning a character area in an edge image in the character area positioning method of the present disclosure. As shown in FIG. 7, the character area positioning method includes steps 701 to 703.

In step 701, determine first edge points in different positions of one of the two adjacent edge lines, and respectively determine a second edge point corresponding to each of the first edge points in the other one of the two adjacent edge lines. For example, a first edge point and a second edge point located on an adjacent edge line of the line the first edge point located on are determined. In some embodiments, it is possible to transverse the edge image, and take one edge point as a first edge point each time, until association confirmation is accomplished between each point in the entire image or the entire edge line and a corresponding second edge point. On the basis of the first edge point, the pixel point opposite to the first edge point in an edge line adjacent to the edge line in which the first edge point is situated may be taken as a second edge point. For example, two horizontal edges are longitudinally parallel to each other, where the coordinate of the first edge point is (x, y), then the coordinate of the second edge point is (x, y+n), wherein, n is the distance between the first and second edge points.

In step 702, the row height is determined according to the distance between the first edge point and the second edge point. In some embodiments, it is possible to transverse the entire image, so as to obtain a row height between each of the first edge points and the corresponding second edge point.

In step 703, the first edge line is determined by connecting the adjacent first edge points having a difference in row height within a predetermined distance difference, and the second edge line is determined by connecting the adjacent second edge points having a difference in row height within a predetermined distance difference. The area between the first edge line and the second edge line is the character area.

In some embodiments, select first edge points and second edge points when the difference in the determined distance is within a predetermined distance difference range, then determine the first edge line and the second edge line based on the points, includes connecting the selected first edge points to determine the first edge line, and connecting the selected second edge points to determine the second edge line.

In some embodiments, if at least two first edge points are adjacent, and the second edge points corresponding to the first edge points are also adjacent, and moreover, among these adjacent edge points, the distances different between the first edge points and the corresponding second edge points are within the predetermined distance difference range, it may be considered that the first edge points and the second edge points are respectively the upper side line points and the lower side line points of a character (the left and right side line points in a vertical state). Therefore, the adjacent edge points may be connected to obtain an upper side line of a character, and a lower side line of a character (the left and right side lines in a vertical state), and the area between the side lines is a character area.

By such method, the side lines of the character may be obtained based on the edge image, thereby the character area may be obtained. Since it is not necessary to judge each single character, the calculation is reduced, and it is not affected by different stroke boldness and irregular areas having distinct pixel values, thereby the efficiency and accuracy of positioning a character area is improved.

Figure 8:
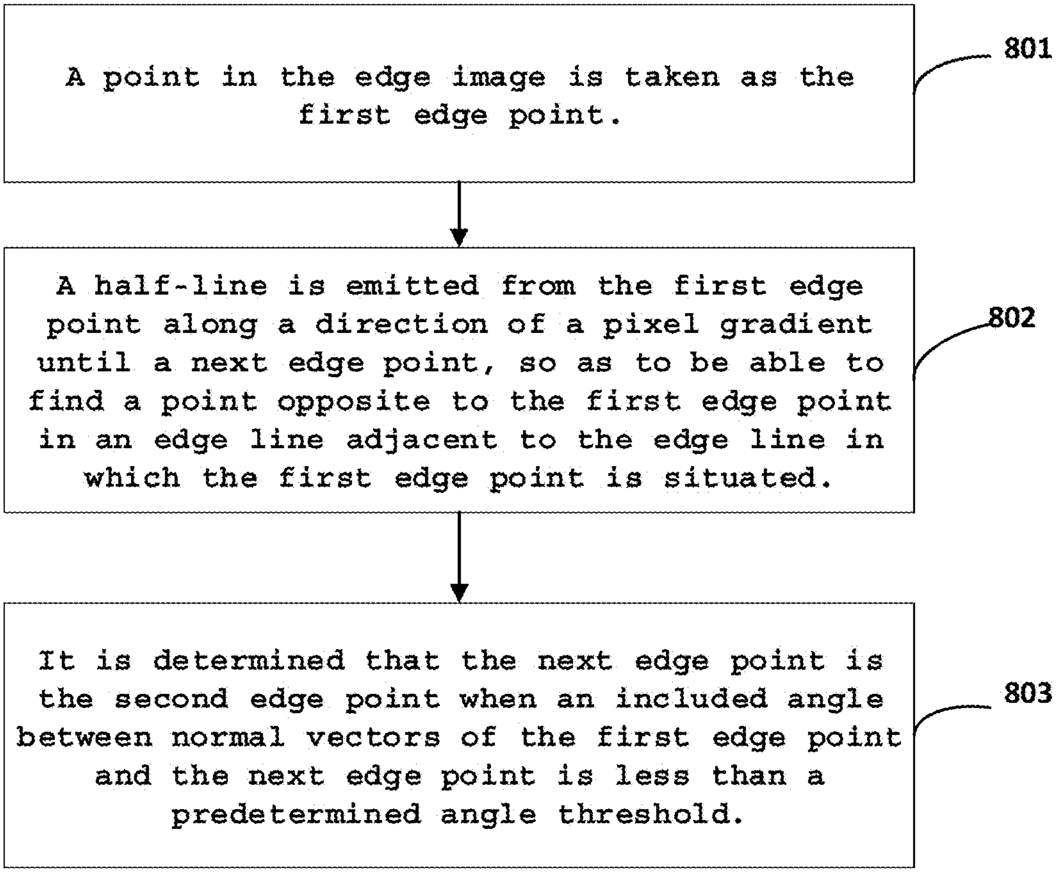
FIG. 8 is a flow chart of some embodiments of determining edge points in the character area positioning method of the present disclosure.

FIG. 8 shows a flow chart of some embodiments of determining the edge point in the character area positioning method of the present disclosure. As shown in FIG. 8, the character area positioning method includes steps 801 to 803.

In step 801, a point in the edge image is taken as the first edge point. In some embodiments, it is possible to transverse the edge image, and take one edge point as the first edge point each time until the second edge point corresponding to each edge point in the entire image is determined, or until the second edge point corresponding to each edge point in the entire edge line is determined.

In step 802, a half-line is emitted from the first edge point along the direction of the pixel gradient until the first edge point along a direction of a pixel gradient until another edge line, and determining the intersection point of the half-line and the another edge line to be a next edge point, so as to be able to find a point corresponding to the first edge point in an edge line adjacent to the edge line in which the first edge point is situated.

In step 803, the next edge point is determined to be the second edge point when the included angle between normal vectors of the first edge point and the next edge point is less than the predetermined angle threshold. In some embodiments, the predetermined angle threshold may be 30 degrees. The normal vector of the pixel is the gradient of the pixel or the derivative of the pixel. As the digital image consists of discrete point value spectrums, it may be referred to as a two-dimensional discrete function. The normal vector thereof may be determined by deriving the two-dimensional discrete function.

By such method, the first edge point and the corresponding second edge point can be determined on the basis of the edge image, thus providing a data basis for calculating the distance between the first edge point and the second edge point. Since the second edge point is determined in such a manner as to emitting a half-line along a direction of the pixel gradient, the obtained relative position of the second edge point and the first edge point which is uncertain, might be in longitudinal, latitudinal or other positional relation according to the pixel variation condition, thereby enabling determining a transverse character area, a longitudinal character area, an italic character area, and even a sector character area. Thus neglected positioning caused by irregular typesetting is prevented, and the accuracy of character positioning is improved.

Figure 9:
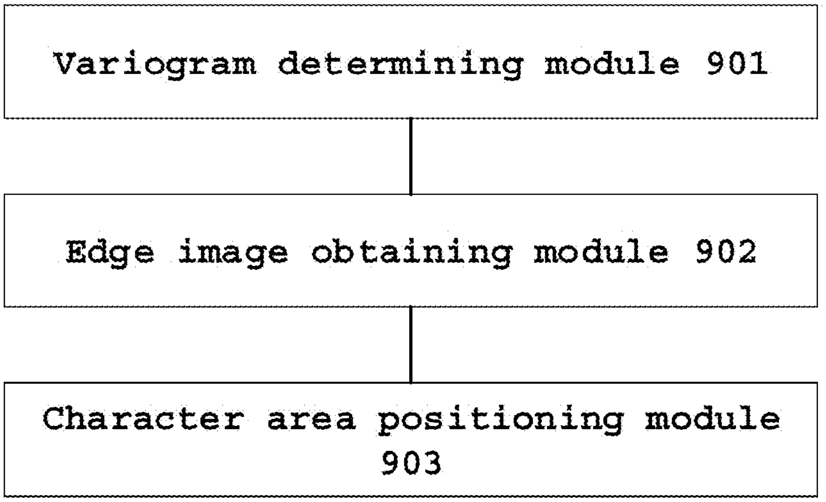
FIG. 9 is a schematic view of some embodiments of the character area positioning device of the present disclosure.

FIG. 9 shows a schematic view of some embodiments of the character area positioning device of the present disclosure. As shown in FIG. 9, the character area positioning device includes a variogram determining module 901, an edge image obtaining module 902, and a character area positioning module 903.

The variogram determining module 901 can obtain a variogram according to an original image. In some embodiments, the pixel value variance of each pixel point with its several surrounding pixel points in the image may be obtained according to the pixel value of each point in the original image. For example, the variogram pixel of one point of several consecutive horizontal points is determined by taking a variance of them. The variogram is determined by calculating a variance of the pixel values of each point with its several surrounding points.

In some embodiments, the variogram determining module 901 can obtain the pixel value of the target pixel position in the original image, and pixel values of adjacent pixel points of the target pixel position, and then determine the pixel value of the target pixel position in the variogram by taking the variance value of the pixel values of the target pixel position and the adjacent pixel points in the original image. The adjacent pixel points may be a predetermined number of consecutive pixel points of the target pixel position in horizontal and vertical directions or within a predetermined range in the directions of up, down, left, and right. The predetermined number may be set according to experience or actual needs.

By such device, the variogram thereof can be calculated on the basis of the original image. The variogram can reflect a variation condition of the image, thereby the position where the image varies intensely is obtained, and distinguishing a character area from other image areas is facilitated.

The edge image obtaining module 902 can obtain the edge image of the variogram. In some embodiments, the edge image may be determined by using any edge detection algorithm in the related art.

In some embodiments, on the basis of the variogram, the edge image obtaining module 902 can further extract the edge contour of the variogram to obtain the edge image. It may be implemented by using any edge image extraction algorithm in the related art, for example determining an image edge by using a Canny operator to obtain an edge image.

By such device, an edge contour of the variogram can be further obtained on the basis of variogram, thereby facilitating the calculation based on the edge image and obtaining a character area located between the edge points.

The character area positioning module 903 can determine an area between the two adjacent edge lines to be a character area according to a difference in distances between the two adjacent edge lines at different positions, for example, when a distance difference between opposite edge points in two adjacent edge lines in the edge image is within the predetermined distance difference range. In some embodiments, two approximately parallel edge lines may be obtained in the edge image, and the edge lines may be straight lines, curves, and may have breakpoints in the middle, and the like. If the distance between two edge lines is relatively stable and the distance variation range is within the predetermined distance difference, the area between the two edge lines may be considered as a character area.

By such device, it is possible to determine the character area according to the distance between the edge lines in the edge image by using the characteristic of similar character heights in the character area, and adapt to various different fonts without an influence caused by variation in boldness of a character stroke, and it is possible to avoid the influence caused over positioning by the complicated pixel variation condition of the image, and the accuracy of positioning a character area is improved.

Figure 10:
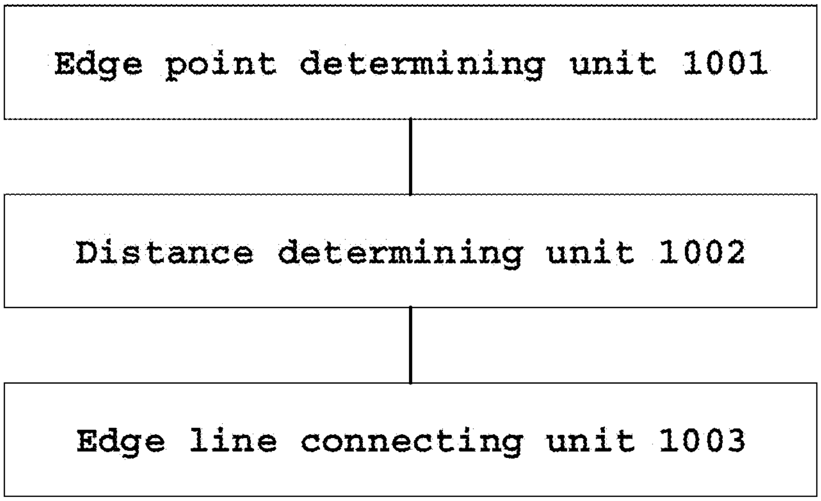
FIG. 10 is a schematic view of some embodiments of the character area positioning module in the character area positioning device of the present disclosure.

FIG. 10 further shows a schematic view of some embodiments of the character area positioning module in the character area positioning device of the present disclosure. As shown in FIG. 10, the character area positioning module includes an edge point determining unit 1001, a distance determining unit 1002, and an edge line connecting unit 1003.

The edge point determining unit 1001 can determine the first edge point and the second edge point located on an adjacent edge line corresponding to the line the first edge point located on. In some embodiments, it is possible to transverse an edge image, and take one edge point as the first edge point each time until association relation confirmation with the corresponding second edge point is accomplished between each point in the entire image or the entire edge line. On the basis of the first edge point, the pixel point corresponding to the first edge point in the edge line adjacent to the edge line in which the first edge point is situated may be taken as the second edge point. For example, two horizontal edges are longitudinally parallel to each other, the coordinate of the first edge point is (x, y), then the coordinate of the second edge point is (x, y+n), wherein, n is a distance between the first and second edge points.

The distance determining unit 1002 can determine the distances between the first edge points and the corresponding second edge point, and regard them as row heights. In some embodiments, it is possible to transverse the entire image, so as to obtain a row height between each of the first edge points and the corresponding second edge point.

The edge line connecting unit 1003 connects the adjacent first edge points having a difference in row height within the predetermined distance difference to determine the first edge line, and connects the adjacent second edge points having a difference in row height within a predetermined distance difference to determine the second edge line, and the area between the first edge line and the second edge line is the character area.

In some embodiments, if at least two first edge points are adjacent, and the second edge points corresponding to the first edge points are also adjacent, and moreover, among these adjacent edge points, the distances different between the first edge points and the corresponding second edge points are within the predetermined distance difference range, it may be considered that the first edge points and the second edge points are respectively the upper side line points and the lower side line points of a character (the left and right side line points in a vertical state). Therefore, the adjacent edge points may be connected to obtain an upper side line of a character, and a lower side line of a character (the left and right side lines in a vertical state), and the area between the side lines is a character area.

By such device, the side lines of the character may be obtained on the basis of the edge image, thereby the character area is obtained. Since it is not necessary to judge each single character, the calculation is reduced, and it is not affected by different stroke boldness and irregular areas having distinct pixel values, thereby the efficiency and accuracy of positioning the character area is improved.

Figure 11:
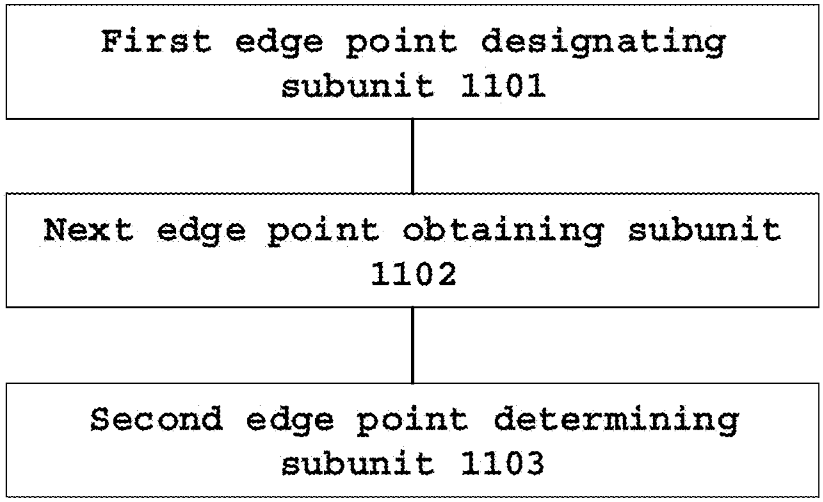
FIG. 11 is a schematic view of some embodiments of an edge point determining unit in the character area positioning device of the present disclosure.

FIG. 11 further shows a schematic view of some embodiments of the edge point determining unit in the character area positioning device of the present disclosure. As shown in FIG. 11, the edge point determining unit includes a first edge point designating subunit 1101, a next edge point obtaining subunit 1102, and a second edge point determining subunit 1103.

The first edge point designating subunit 1101 can take a point in the edge image as the first edge point. In some embodiments, it is possible to transverse the edge image, and take one edge point as the first edge point each time until the second edge point corresponding to each edge point in the entire image is determined or the second edge point corresponding to each edge point in the entire edge line is determined.

The next edge point obtaining subunit 1102 can emit a half-line from the first edge point along the direction of the pixel gradient until a next edge point, so as to be able to find a point opposite to the first edge point in an edge line adjacent to the edge line in which the first edge point is situated.

The second edge point determining subunit 1103 can determine that the next edge point is the second edge point when the included angle between normal vectors of the first edge point and the next edge point is less than the predetermined angle threshold. In some embodiments, the predetermined angle threshold may be 30 degrees.

By such device, the first edge point and the corresponding second edge point can be determined based on the edge image, thus providing a data basis for calculating the distance between the first edge point and the second edge point. Since the second edge point is determined in such a manner as to emitting a half-line along a direction of the pixel gradient, the obtained relative position of the second edge point and the first edge point which is uncertain, might be in longitudinal, latitudinal or other positional relation according to a pixel variation condition. In this way, it is possible to determine a transverse character area, a longitudinal character area, an italic character area, and even a sector character area. Thus, the neglected positioning caused by irregular typesetting is prevented, and the accuracy of character positioning is improved.

Figure 12:
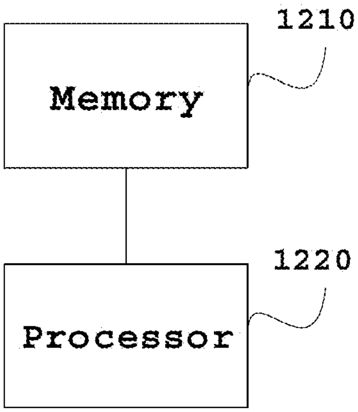
FIG. 12 is a schematic view of other embodiments of the character area positioning device of the present disclosure.

FIG. 12 shows a schematic structural view of other embodiments of the character area positioning device of the present disclosure. As shown in FIG. 12, the character area positioning device comprises a memory 1210 and a processor 1220.

The memory 1210 may be a magnetic disk, a flash memory, or any other non-volatile storage medium. The memory is used to store instructions in the corresponding embodiments of the character area positioning method, which include simulation platform side instructions, and may also include management system side instructions.

The processor 1220 which is coupled to the memory 1210, may be implemented as one or more integrated circuits, such as a microprocessor or a microcontroller. The processor 1220 which is configured to execute instructions stored in the memory, can implement positioning a character area.

Figure 13:
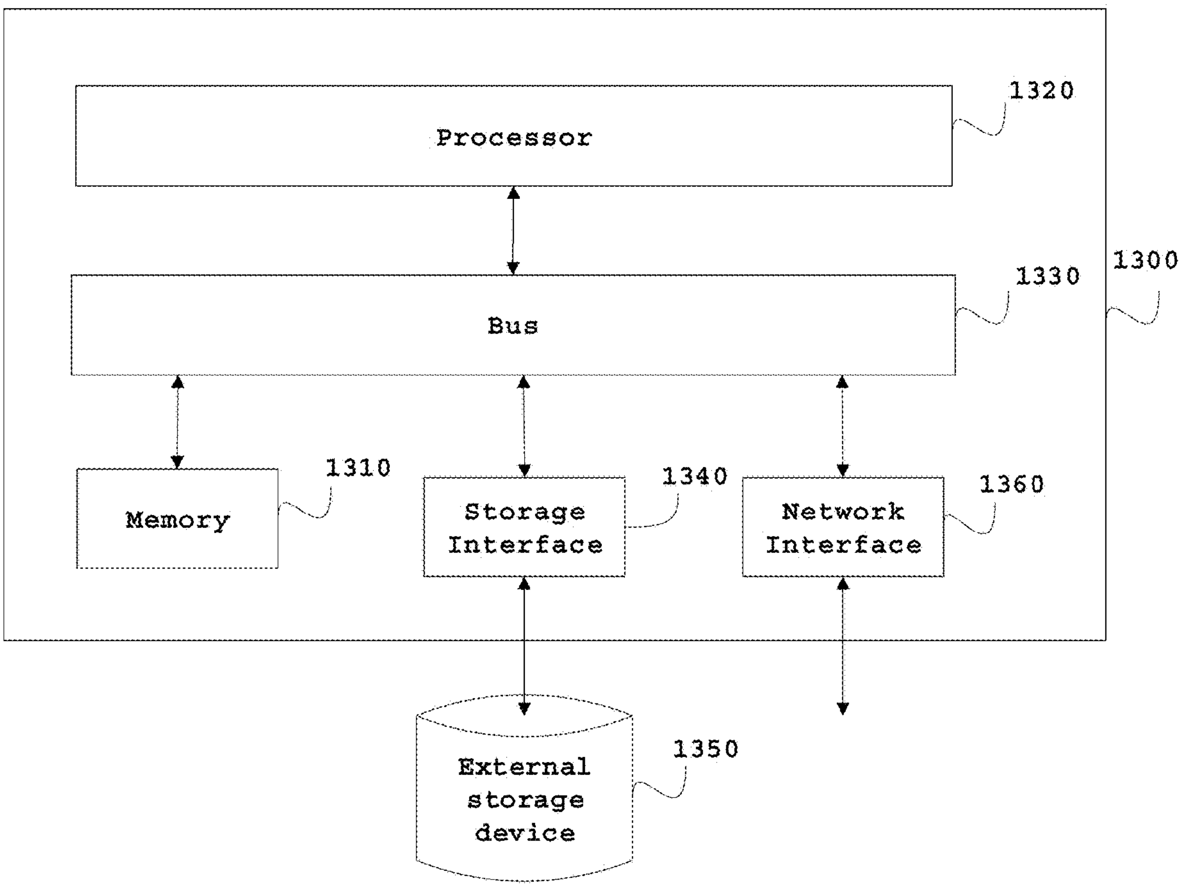
FIG. 13 is a schematic view of further embodiments of the character area positioning device of the present disclosure.

In some embodiments, it may also be that, as shown in FIG. 13, the character area positioning device 1300 comprises a memory 1310 and a processor 1320. The processor 1320 is coupled to the memory 1310 via a bus 1330. The character area positioning device 1300 may also be connected to the external storage device 1350 via a storage interface 1040 for calling external data and may also be connected to the network or another computer system (not shown) via the network interface 1360. It will not be introduced in detail here.

In this embodiment, it is possible to implement operating the character area positioning device by storing data instructions by the memory, and then by processing the above-described instructions by the processor.

In other embodiments, a computer readable storage medium has stored thereon computer program instructions which, when executed by a processor, implement the steps of the method in the embodiments corresponding to a character area positioning method. Those skilled in the art will appreciate that the embodiments of the present disclosure may be provided as a method, device, or computer program product. Accordingly, the present disclosure may take the form of an entirely hardware embodiment, an entirely software embodiment, or a combination of software and hardware aspects. Moreover, the present disclosure may take the form of a computer program product embodied in one or more computer-usable non-transitory storage media (including but not limited to disk memory, CD-ROM, optical memory, and the like) containing computer usable program codes therein.

The present disclosure is described with reference to the flow charts and/or block diagrams of methods, devices (systems), and computer program products according to the embodiments of the present disclosure. It will be understood that each step and/or block of the flow charts and/or block diagrams as well as a combination of steps and/or blocks of the flow charts and/or block diagrams may be implemented by a computer program instruction. These computer program instructions may be provided to a processor of a general purpose computer, special purpose computer, an embedded processing machine, or other programmable data processing devices to produce a machine, such that the instructions executed by a processor of a computer or other programmable data processing devices produce a device for realizing a function designated in one or more steps of a flow chart and/or one or more blocks in a block diagram.

These computer program instructions may also be stored in a computer readable memory that can guide a computer or other programmable data processing device to operate in a manner, such that the instructions stored in the computer readable memory produce a manufacture including an instruction device. The instruction device realizes a function designated in one or more steps in a flow chart or one or more blocks in a block diagram.

These computer program instructions may also be loaded onto a computer or other programmable data processing devices, such that a series of operational steps are performed on a computer or other programmable device to produce a computer-implemented processing, such that the instructions executed on a computer or other programmable devices provide steps for realizing a function designated in one or more steps of the flow chart and/or one or more blocks in the block diagram.

Heretofore, the present disclosure has been described in detail. Some details well known in the art are not described to avoid obscuring the concept of the present disclosure. According to the above description, those skilled in the art would fully know how to implement the technical solutions disclosed herein.

The method and device of the present disclosure may be implemented in many manners. For example, the method and device of the present disclosure may be implemented by a software, hardware, firmware, or any combination of a software, hardware, and firmware.

The above-described sequence of steps for the method is for illustrative purposes only, and the steps of the method of the present disclosure are not limited to the sequence specifically described above unless otherwise specifically stated. Moreover, in some embodiments, the present disclosure may also be embodied as programs recorded in a recording medium, which include machine readable instructions for implementing the method according to the present disclosure. Thus, the present disclosure also covers recording medium storing programs for performing the method according to the present disclosure.

Finally, it should be explained that: the aforementioned embodiments are only used to describe the technical solution of the present disclosure rather than limiting the same; although detailed explanations are made to the present disclosure by referring to preferred embodiments, a common technical person in the art should understand that: it is still possible to make amendments to the embodiments of the present disclosure or make equivalent replacements to part of the technical features; without departing from the spirit and scope of the present disclosure, they should all be covered in the scope of the technical solution for which protection is sought in the present disclosure.

What is claimed is:

1. A character area positioning method, comprising:
- obtaining a variogram according to an original image;
- obtaining an edge image of the variogram; and
- determining an area between two adjacent edge lines to be a character area according to a difference in distances between the two adjacent edge lines at different positions.

2. The character area positioning method according to claim 1, wherein determining the area between the two adjacent edge lines to be the character area comprises:
- determining first edge points in different positions of one of the two adjacent edge lines, and respectively determining a second edge point corresponding to each of the first edge points in the other one of the two adjacent edge lines;
- determining distances between the first edge points and the corresponding second edge points;
- selecting first edge points and second edge points when the difference in the determined distance is within a predetermined distance difference range; and
- connecting the selected first edge points to determine a first edge line, and connecting the selected second edge points to determine a second edge line, and determining the area between the first edge line and the second edge line to be the character area.

3. The character area positioning method according to claim 2, wherein determining the second edge point corresponding to each of the first edge points in the other one of the two adjacent edge lines comprises:
- emitting a half-line from the first edge point along a direction of a pixel gradient until another edge line, and determining the intersection point of the half-line and the another edge line to be a next edge point; and
- determining that the next edge point is the second edge point when an included angle between normal vectors of the first edge point and the next edge point is less than a predetermined angle threshold.

4. The character area positioning method according to claim 1, wherein obtaining the variogram according to the original image comprises:
- obtaining a pixel value of a target pixel position in the original image, and pixel values of adjacent pixel points of the target pixel position, wherein the adjacent pixel points comprise a predetermined number of consecutive pixel points adjacent the target pixel position in different directions; and
- determining a pixel value of the target pixel position in the variogram by taking a variance value of the pixel values of the target pixel position and the pixel values of the adjacent pixel points in the original image.

5. The character area positioning method according to claim 1, wherein obtaining the edge image of the variogram comprises:
- obtaining the edge image by calculating an image edge using a Canny operator based on the variogram.

6. The character area positioning method according to claim 1, wherein the character area includes at least one of a transverse character area, a longitudinal character area, an italic character area, or a sector character area.

7. A character area positioning device, comprising:
- a memory; and
- a processor coupled to the memory, which is configured to, based on instructions stored in the memory:
- obtain a variogram according to an original image;
- obtain an edge image of the variogram; and
- determine an area between the two adjacent edge lines to be a character area according to a difference in distances between the two adjacent edge lines at different positions.

8. The character area positioning device according to claim 7, wherein the processor is further configured to:
- determine first edge points in different positions of one of the two adjacent edge lines, and respectively determine a second edge point corresponding to each of the first edge points in the other one of the two adjacent edge lines;
- determine distances between the first edge points and the corresponding second edge points;
- select first edge points and second edge points when the difference in the determined distance is within a predetermined distance difference range; and
- connect the selected first edge points to determine a first edge line, and connect the selected second edge points to determine a second edge line, and determine the area between the first edge line and the second edge line to be the character area.

9. The character area positioning device according to claim 8, wherein the processor is further configured to:
- emit a half-line from the first edge point along a direction of a pixel gradient until another edge line, and determining the intersection point of the half-line and the another edge line to be a next edge point; and
- determine that the next edge point is the second edge point when an included angle between normal vectors of the first edge point and the next edge point is less than a predetermined angle threshold.

10. The character area positioning device according to claim 7, wherein the processor is further configured to:
- obtain a pixel value of a target pixel position in the original image, and pixel values of adjacent pixel points of the target pixel position, wherein the adjacent pixel points consist in a predetermined number of consecutive pixel points from the target pixel position in different directions; and
- determine a pixel value of the target pixel position in the variogram by taking a variance value of the pixel values of the target pixel position and the pixel values of the adjacent pixel points in the original image.

11. The character area positioning device according to claim 7, wherein the processor is further configured to:

obtain the edge image by calculating an image edge using a Canny operator based on the variogram.

12. The character area positioning device according to claim 7, wherein the character area includes at least one of a transverse character area, a longitudinal character area, an italic character area, or a sector character area.

13. A non-transitory computer readable storage medium storing a computer program that, when being executed by a processor, implement method for performing operations comprising:

obtaining a variogram according to an original image;

obtaining an edge image of the variogram; and determining an area between two adjacent edge lines to be a character area according to a difference in distances between the two adjacent edge lines at different positions.

14. The non-transitory computer readable storage medium according to claim 13, wherein determining the area between the two adjacent edge lines to be the character area comprises:

determining first edge points in different positions of one of the two adjacent edge lines, and respectively determining a second edge point corresponding to each of the first edge points in the other one of the two adjacent edge lines;

determining distances between the first edge points and the corresponding second edge points;

selecting first edge points and second edge points when the difference in the determined distance is within a predetermined distance difference range; and connecting the selected first edge points to determine a first edge line, and connecting the selected second edge points to determine a second edge line, and determining the area between the first edge line and the second edge line to be the character area.

15. The non-transitory computer readable storage medium according to claim 14, wherein determining the second edge point corresponding to each of the first edge points in the other one of the two adjacent edge lines comprises:

emitting a half-line from the first edge point along a direction of a pixel gradient until another edge line, and determining the intersection point of the half-line and the another edge line to be a next edge point; and determining that the next edge point is the second edge point when an included angle between normal vectors of the first edge point and the next edge point is less than a predetermined angle threshold.

16. The non-transitory computer readable storage medium according to claim 13, wherein obtaining the variogram according to the original image comprises:

obtaining a pixel value of a target pixel position in the original image, and pixel values of adjacent pixel points of the target pixel position, wherein the adjacent pixel points consist in a predetermined number of consecutive pixel points from the target pixel position in different directions; and determining a pixel value of the target pixel position in the variogram by taking a variance value of the pixel values of the target pixel position and the pixel values of the adjacent pixel points in the original image.

17. The non-transitory computer readable storage medium according to claim 13, wherein obtaining the edge image of the variogram comprises:

obtaining the edge image by calculating an image edge using a Canny operator based on the variogram.

18. The non-transitory computer readable storage medium according to claim 13, wherein the character area includes at least one of a transverse character area, a longitudinal character area, an italic character area, or a sector character area.

* * * * *